Patented Mar. 21, 1933

1,902,408

UNITED STATES PATENT OFFICE

WALTER KREIS, OF BINNINGEN NEAR BASEL, SWITZERLAND, ASSIGNOR TO "CHEMICAL WORKS FORMERLY SANDOZ," OF BASEL, SWITZERLAND

MANUFACTURE OF NEW CARDIO-ACTIVE GLUCOSIDES OF BULBUS SCILLÆ

No Drawing. Application filed September 8, 1927, Serial No. 213,366, and in Germany August 12, 1927.

It has been found, that the cardio-active glucoside of bulbus Scillæ, as prepared according to the United States Letters Patent No. 1,516,552 and No. 1,579,338, can be separated into two components which are coexisting in the drug. Though the physical and chemical properties of these components are distinctly different, they are so intimately connected with each other during the preparation of the active principle, that the hitherto known methods of isolation have always furnished a mixture.

In a publication of Ewins (Journ. of Pharmakology and Experim. Therapeutics vol. III, page 155, 1911) it has already been surmised, that two active principles are coexisting in the squill, but the author has not characterized them as well defined substances. According to the method of isolation and especially, in view of the feeble activity of one of the substances prepared by Ewins, it is evident that these components can only be considered as more or less decomposed products. The great difference which exists between the substances of Ewins and those obtained according to the present process, by their method of isolation and their properties show that the substances of Ewins cannot be identical to those prepared according to the present process, which leads to substances hitherto unknown.

The present process for the separation of the natural cardio-active glucoside of squill is based upon the difference in the solubility of both components in water and aqueous media, e. g. mixtures of water with alcohol or methanol. This difference was unknown. It exists even when the components are in the form of their compounds with natural tannin, the so-called tannoids. For distinction purposes I call hereinafter the less soluble component A and the more soluble B. By the aid of a new color-reaction which will be described below, it became possible to distinguish that two natural glucosides are coexisting in the squill, whilst the physiological activity, in which both components are very similar, could not be used for this purpose. Component A dissolved in acetic anhydride, gives on the addition of concentrated sulphuric acid a carmine color which immediately afterwards turns to an emerald-green one. The component B, under the same conditions gives a pure blue color, without showing a red phase at the beginning. As already mentioned, the two components adhere obstinately to each other in the drug and also during the isolation of the glucoside. Therefore, it could not be foreseen, that it would be possible to separate the two components A and B and to obtain the pure glucosides in such a simple manner as described in the present process, even when these components are present in the form of their so-called tannoids.

In application of the newly found difference in the solubility of both components and the use of the color reaction as a control, has rendered it possible to carry out the process, even with a relatively raw initial material. It has been shown, for example, that the difference in the solubility of the components in water or in aqueous mediums exists even when many impurities are present, as is the case with an alcoholic and previously purified extract of the drug.

A raw extract can be suitably purified, by dissolving in methanol and afterwards precipitating the principal quantity of the impurities with chloroform, whilst the glucosides remain in solution in the form of their so-called tannoids. The solution is decanted from the precipitate and evaporated in vacuo. The dried residue is pulverized and then stirred with water until a fine suspension is obtained. The component A remains in the undissolved part; its separation from B is facilitated by the addition of salt to the watery suspension. The component B remains in solution in tannoid form.

Its aqueous solution is then treated with tannin precipitating agents, afterwards acidulated and shaken with, for example, chloroform, to remove acid impurities. The solution is then neutralized and saturated with an easily soluble salt, e. g. sulphate of ammonia, and the pure glucoside B exhaustively extracted by shaking with ethyl acetate. After evaporating the solution in vacuo at a low temperature and after treating the residue with ether, the pure glucoside B remains.

The separation of the components can be carried out in an analogous manner with an initial material, which has been prepared in the following way. A raw extract is suspended in water, the solution saturated with salt and the so-called tannoids extracted with ethyl acetate, whereby the inactive impurities remain in the aqueous solution. The ethylacetate solution is then evaporated to dryness and a mixture of the components A and B in the form of tannoid remains, with which the separation can be effected by fractional dissolution in water and the pure glucosides can be obtained as described above (see also Example 2). The separation of the components may also be effected by means of fractional precipitation from an organic solvent, e. g. alcohol with water, whereby component A precipitates first or by fractional extraction from an aqueous solution with an organic solvent, e. g. ethyl acetate, whereby component A is first extracted. In any case the separation of the components is based upon the difference existing in the solubility of A and B in water or in aqueous media. The carrying out of the process is not limited to the manners described in the examples. A separation of the components A and B, which always coexist in squill, is obtained in all cases, as well as their isolation as free glucosides. The latter substances only exist in nature as so-called tannoids.

The component A, which, as a rule, constitutes ⅔ of the totality of the natural glucoside of squill, crystallizes from methanol (97%) in the form of quadrangular and hexagonal oblong and clear plates, containing 6½% of solvent of crystallization, which separates off completely only in vacuo at 76° C. The substance freed from the solvent of crystallization is a white powder, which is very difficultly soluble in water and chloroform, and insoluble in ether. It is rather difficultly soluble in cold methyl- and ethylalcohol and only rendered more easily soluble by warming. A 5% solution of the component A in a mixture of 75 parts by volume of ethylalcohol and 25 parts by volume of water shows a rotary power of $$(a)\frac{20}{D} = -78°.$$

The elementary analysis gives the following result: $C=62.3\%$ and $H=7.6\%$.

The glucoside is easily hydrolyzed in aqueous solutions and this hydrolyzation can be quickly completed by the addition of mineral acids. The products of hydrolyzation are, on the one hand, an aglucone A, which crystallizes in beautiful columns, on the other hand glucose and rhamnose, these products being obtained in the molecular proportion 1:1:1. The elementary analysis of the aglucone gives the following result: $C=78.7\%$ and $H=8.3\%$. Aglucone A can be sublimated in vacuo, whereby one molecule of water is split off. The glucoside, as well as the aglucone, when dissolved in a mixture of 100 parts of acetic anhydride and 2 parts of concentrated sulphuric acid, give first a carmine color and immediately afterwards an emerald green color.

One mg. of the glucoside component A possesses a physiological activity of about 1050 frog doses by one mg. of substance according to the frog standard of Houghton-Straub. The aglucone is less active.

The component B, the isolation of which is claimed by the present process could hitherto not be obtained in a crystalline form; it constitutes a white powder, when in a pure state. Contrarily to the component A, it is easily soluble in water and alcohols, difficultly soluble in chloroform, ether and ethylacetate, but more easily soluble in these solvents than the component A; the component B is dextrorotary. It is more resistant to hydrolysis than A and is only slowly hydrolyzed by dilute mineral acids, whereby a well crystallizing aglucone is also formed, but only with a small yield. Aglucone B crystallizes from methanol in colorless, glossy long needles. It is insoluble in water and ether and somewhat more easily soluble in the usual solvents than aglucone A.

The elementary analysis of aglucone B gives the following result: $C=73.1\%$, $H=7.4\%$. The aglucone B cannot be sublimated. It sinters at 225° C. and melts under decomposition at 228–229° C. A mixture of acetic anhydride and concentrated sulphuric acid (100:2) dissolves both the glucoside and the aglucone B with a deep blue color, which remains for some length of time.

One mg. of the glucoside component B possesses a physiological activity of at least 1500–1600 frog doses (frog standard of Houghton-Straub).

The following examples illustrate the improved process.

*Example 1*

150 g. of a raw extract, obtained by extraction of carefully dried and powdered squills with alcohol of 95% strength at a low temperature and evaporating the solvent in vacuo at a low temperature to dryness, are dissolved in 450 ccm. of cold methanol of 99% and filtered. Afterwards 4–4½ litres of chloroform are poured into the filtrate while stirring, whereby the principal quantity of the impurities are precipitated. The liquid, after having been allowed to stand over night, is decanted, filtered and evaporated in vacuo to dryness.

50 g. of the dried residue are stirred with a small quantity of cold water to a homogeneous pulp, which is then diluted with water to 1000 ccm. By this operation a first separation of the components A and B is effected. The separation of the component A and its filtration is facilitated by the addition of a soluble salt, e. g. 25 ccm. of a saturated solution of common salt. After the liquid has been allowed to stand for some time, it is filtered, washed with some solvent and vigorously drained. The residue obtained contains the component A which can be isolated therefrom in any convenient manner.

The watery filtrate, containing the component B and generally showing a weakly acid reaction, is carefully neutralized with diluted caustic soda for instance. The solution is then shaken with a small portion of an insoluble tannin precipitating agent, e. g. lead hydroxide, until the latter remains white. Acid admixtures are removed by the addition of 1 ccm. of 2 n $H_2SO_4$ per litre of liquid and exhaustive extraction with chloroform. The watery solution is again neutralized with soda and saturated with sulphate of ammonia and the glucoside B then exhaustively extracted with ethyl acetate. The ethyl acetate solution is evaporated in vacuo at a low temperature until it is almost dry. Finally the residue is treated with ether and filtered. The properties of the dried glucoside B, thus obtained, correspond to those mentioned above.

*Example 2*

The initial material for the separation of the components in this example has been prepared in the following manner. Carefully dried and pulverized squill, rich in glucoside, was exhaustively extracted with cold alcohol, and the extract evaporated in vacuo at a low temperature to dryness. The residue was dissolved in water, 100 g. of common salt were added per litre and the solution exhaustively extracted with ethyl acetate. The product which is obtained, by evaporating the ethyl acetate in vacuo to dryness, consists of a mixture of the components A and B in the form of their so-called tannoids. Of this mixture 40 g. are stirred in a mortar with a little water to a homogeneous paste, and this is then further diluted by addition of water, whilst continually stirring, whereby the difficultly soluble component A generally precipitates in a flocculent state. If lumps are formed, they should be granulated by the addition of a little water. The total quantity of water used should not exceed one litre. The precipitation of the component A is completed by the addition of 25 ccm. of a saturated common salt solution. The mass is left to stand for a short time, and the residue containing the tannoid A is separated by filtration. The watery solution of the component B as obtained after separation of the tannoid component A is, after careful neutralization, shaken with small quantities of an insoluble tannin precipitating agent, as indicated in Example 1, until the latter remains white. Some impurities still remaining in the last filtrate are removed by acidulating with 1 ccm. of 2 N sulphuric acid per litre and thoroughly shaking with some chloroform. The watery solution is again neutralized and carefully evaporated in vacuo to dryness. The glucoside B may be obtained in a pure state by extracting the residue with absolute alcohol. After evaporating the solvent in vacuo at a low temperature, the glucoside B remains, possessing the above described properties.

What I claim is:

1. A process for the isolation of an easily soluble cardio-active glucoside from bulbus Scillæ, comprising the steps of dissolving a raw alcoholic extract from bulbus Scillæ in an aliphatic alcohol selected from a class comprising methanol and ethanol, treating this solution with chloroform in order to precipitate the inactive impurities, filtering the solution, evaporating same in vacuo at a low temperature, extracting the residue thus obtained which consists of a mixture of tannoids of the active glucosides, with water, in order to separate the water-insoluble portion, treating the obtained aqueous extract with tannin precipitating substances, separating the solution from the precipitate thus obtained, extracting the easily soluble glucoside from the solution by means of a neutral aliphatic organic liquid from the class of chloroform and ethylacetate, and isolating the glucoside in dry form from its solution in the organic solvent by evaporating the solvent in vacuo.

2. A process for the isolation of an easily soluble cardio-active glucoside from bulbus Scillæ, comprising the steps of dissolving a raw alcoholic extract from bulbus Scillæ in an aliphatic alcohol selected from a class comprising methanol and ethanol, treating this solution with chloroform in order to precipitate the inactive impurities, filtering the solution, evaporating same in vacuo at a low temperature, extracting the residue thus obtained which consists of a mixture of tannoids of the active glucosides, with water in presence of easily water soluble salts, in order to separate the water-insoluble portion, treating the obtained aqueous extract with tannin precipitating substances, separating the solution from the precipitate thus obtained, extracting the easily soluble glucoside from the solution by means of a neutral aliphatic organic liquid from the class of chloroform and ethylacetate, and isolating the glucoside in dry form from its solution in the organic solvent by evaporating the solvent in vacuo.

3. A process for the isolation of an easily soluble cardio-active glucoside from bulbus Scillæ, comprising the steps of dissolving a raw alcoholic extract from bulbus Scillæ in an aliphatic alcohol selected from a class comprising methanol and ethanol, treating this solution with chloroform, in order to precipitate the inactive impurities, filtering the solution, evaporating the same in vacuo at a low temperature, extracting the residue thus obtained, which consists of a mixture of tannoids of the active glucosides, with water in presence of easily water soluble salts, in order to separate the water-insoluble portion, treating the obtained aqueous extract with tannin precipitating substances, separating the solution from the precipitate thus obtained, extracting the easily soluble glucoside from the solution by means of a neutral aliphatic organic liquid from the class of chloroform and ethylacetate in presence of a larger amount of easily water soluble salts, and isolating the glucoside in dry form from its solution in the organic solvent by evaporating the solvent in vacuo.

4. A process for the isolation of an easily soluble cardio-active glucoside from bulbus Scillæ, comprising the steps of dissolving a raw alcoholic extract from bulbus Scillæ in an aliphatic alcohol selected from a class comprising methanol and ethanol, treating this solution with chloroform in order to precipitate the inactive impurities, filtering the solution, evaporating same in vacuo at a low temperature, extracting the residue thus obtained which consists of a mixture of tannoids of the active glucosides, with water in presence of easily water soluble salts, in order to separate the water-insoluble portion, treating the obtained aqueous extract with water insoluble tannin precipitating substances, separating the solution from the precipitate thus obtained, extracting the easily soluble glucoside from the solution by means of a neutral aliphatic organic liquid from the class of chloroform and ethylacetate in presence of a larger amount of easily water soluble salts, and isolating the glucoside in dry form from its solution in the organic solvent by evaporating the solvent in vacuo.

5. A process for the isolation of an easily-soluble cardio-active glucoside from bulbus Scillæ, comprising the steps of extracting a purified extract from bulbus Scillæ, which consists of a mixture of tannoids of the active glucosides, with water in presence of easily water soluble salts, in order to separate the water-insoluble portion, treating the obtained aqueous extract with water-insoluble tannin precipitating substances, separating the solution from the precipitate thus obtained, extracting the easily soluble glucoside from the solution by means of a neutral aliphatic organic liquid from the class of chloroform and ethylacetate in presence of a larger amount of easily water-soluble salts, and isolating the glucoside in dry form from its solution in the organic solvent by evaporating the solvent in vacuo.

6. As a new article of manufacture the herein described cardio-active substance of bulbus Scillæ, consisting of a body in form of free glucoside, being a white powder easily soluble in water, methyl- and ethyl-alcohol, difficultly soluble in chloroform, ether and ethylacetate, being dextrorotary, giving on hydrolyzation sugar and an aglucone, the latter crystallizing from methanol in form of colorless, long needles, the aglucone containing 73.1% of carbon and 7.4% of hydrogen, both the glucoside and the aglucone giving with acetic anhydride and sulphuric acid a deep blue color; 1 mg. of the glucoside possessing a physiological activity of at least 1600 frog doses, according to the frog standard of Houghton-Straub.

In witness whereof I have hereunto signed my name this 29th day of August 1927.

WALTER KREIS.